Aug. 2, 1960 J. BÖTTGER 2,947,292
PISTON FOR INTERNAL COMBUSTION ENGINES, PARTICULARLY
FOR SELF-IGNITION ENGINES HAVING COMBUSTION
CHAMBERS ADAPTED FOR DIRECT FUEL INJECTION
Filed April 21, 1958 3 Sheets-Sheet 1

INVENTOR.
Josef Böttger

INVENTOR.
Josef Böttger

United States Patent Office 2,947,292
Patented Aug. 2, 1960

2,947,292

PISTON FOR INTERNAL COMBUSTION ENGINES, PARTICULARLY FOR SELF-IGNITION ENGINES HAVING COMBUSTION CHAMBERS ADAPTED FOR DIRECT FUEL INJECTION

Josef Böttger, 5 V Mezihori, Prague, Czechoslovakia

Filed Apr. 21, 1958, Ser. No. 729,674

Claims priority, application Czechoslovakia May 7, 1957

5 Claims. (Cl. 123—32)

The present invention relates to a piston for self-ignition engines having direct fuel injection into a combustion chamber formed in the piston. The combustion chamber formed in the piston is adapted to receive, at the end of the compression stroke, almost the entire charge of air which is rotated around the cylinder axis by well known means, and the fuel is injected from an eccentrically positioned nozzle situated at the edge of the passage between the combustion space and the chamber in the piston. The fuel jets emanating from this multi-orifice nozzle are preferably arranged, in a well known manner, so as to impinge at different free lengths and different time intervals on the combustion chamber wall or one of the jets, a so-called ignition jet, is made to spray partially over the hottest point of the combustion chamber wall and may be directed to strike partially against the piston top.

At the present time it is generally known that, for obtaining smokeless and noisless combustion, the area of the combustion chamber wall against which the fuel charge impinges must not have a temperature variation in excess of a certain limit corresponding to the quality of fuel used.

The combustion chamber wall temperature is mainly influenced by the velocity and temperature of the gases during combustion. As is well known, the temperature of the gases is exclusively determined by the efficiency of combustion, which should be as high as possible. Owing to this fact, the designer should control the temperature of the combustion chamber wall at least by the velocity of the incoming charge of combustion air which, during the compression stroke, follows the same path, but in the opposite sense, as the path of the combustion gases during the working stroke. Thus the incoming air cools the piston surface, i.e. both the piston top and the combustion chamber wall, to an extent determined by the direction and intensity of the air stream. If the highest possible efficiency of wall cooling is to be obtained, the air must flow along the combustion chamber wall. Thus, the most efficient cooling with a combustion chamber having the shape of a body of revolution may be obtained through the medium of air rotating around the axis of that body. Means for producing such an air rotation are well known, e.g. masked valves or, still more advantageously, inlet passages having tangential openings. It is thus possible to cause the air to enter the combustion chamber in mathematically determined spirals.

To enable the air to flow into the combustion chamber and along the wall of the latter, this chamber having the well known shape of a body of revolution, which is either elliptical or toroidal, is provided, according to the present invention, with a passage between the combustion chamber and the space above the piston which is adapted to the movement of the incoming air along spiral paths. According to the present invention, the opening of the combustion chamber into the space above the piston is divided into two similar semi-circular halves, symmetrically off-set with respect to the axis of revolution of the combustion chamber. The shortest possible connecting lines between the edge of this wing shaped opening, defined by offset semi-circles, and edge of the combustion chamber in the shape of a body of revolution, forms a lateral wall of the combustion chamber. The above described configuration of the combustion chamber embodying the present invention ensures that a part of the air flow thoroughly cools the combustion chamber lateral wall at the point where the fuel jet impinges thereagainst, while another portion of the air flow is diverted from the combustion chamber wall to reduce cooling in other zones, thereby to increase the area of the wall having a range of temperatures within the desired limit and permit the spraying of the fuel against this increased area.

The above cooling characteristics are achieved by the mutual off-setting of both of the semi-circular halves of the interconnecting passage so that, at each of the halves, the air enters at the outer end of the semi-circle tangentially along the combustion chamber wall while, at the opposite end of the semi-circle closer to the combustion chamber axis, the incoming air increasingly tends to follow the radial component of the air inlet, which causes deviation of the rotational movement from the combustion chamber wall. Owing to this deviation, the cooling effect of air flow becomes lower and the temperature in this combustion chamber wall zone rises.

It may therefore be deduced that, at a point where a plane tangential to the combustion chamber wall and the plane of the top surface of the piston include an angle smaller than 90°, the temperature of the wall or edge of the combustion chamber will be higher than at a point where this angle exceeds 90°. Thus, the mutual eccentricity of both halves of the interconnecting passage ensures that, at the radially outer end of each half of the passage, there will be a lower temperature at the combustion chamber wall than at the radially inner end where the above mentioned angle is smaller than 90°.

This makes it possible to spray the fuel against the combustion chamber wall near the outer end in the direction of the incoming air and the sprayed fuel will spread only over zones presenting an increasing temperature. Thus, the basic requirement for appropriate spraying of fuel against a hot wall is satisfied.

The absolute temperature value of the combustion chamber wall at the point of fuel jet impingement can be decreased, if required, in a well known way; e.g. by spraying oil against the underside of the piston top, that is, against the underside of the combustion chamber. The oil is cooled in a particular circuit separated from the engine lubricating circuit. In order to further improve efficiency of this system of cooling underside of the combustion chamber, particularly at the point of fuel impingement, the underside of the combustion chamber has its cooling surface increased by applying several cooling fins between the combustion chamber bottom and the piston skirt in the zone of the compression piston rings. The material of which the piston is formed may be saved, while improving the cooling efficiency by providing deep recesses between the fins, without affecting the rigidity of the piston top. The cooling of the underside of the piston can be controlled by adjusting the amount of oil sprayed between the fins interconnecting the underside of the combustion chamber with the piston skirt. Thus, the basic temperature of the combustion chamber wall at the point of fuel jet impingement (particularly at the point of impingement of the ignition jet) can be adjusted so that the use of different fuels having essentially different octane numbers is possible. Increasing the area of the cooling surface by means of deep fins, increases the oil spray cooling efficiency to such an extent that, according to the present invention, it will be possible to reduce the amount of oil in the cooling circuit and thus the inherent resistance of the engine.

Finally it must be pointed out that spraying of cooling oil against the combustion chamber bottom from below may be successful only if the cooling oil spraying point and, at the same time, the fuel jet impingement point, lie between both gudgeons of the piston intended to receive the wrist pins. This condition requires that the injection nozzle be positioned so that the fuel jets discharged from a nozzle positioned at the margin of one semi-circular half of the combustion chamber passage impinge near the other semi-circular half of the passage. According to the invention, the plane of symmetry formed by the eccentricity axis of the passage halves and the axis of revolution of the combustion chamber is therefore arranged so that this plane and the plane formed by the axis of revolution of the combustion chamber and the axis of the gudgeons includes an angle smaller or greater than 90°. It will then be possible to locate the injector so as to secure a sufficient free length of the ignition jet.

The above, and other objects, features and advantages of the invention will be apparent in the following detailed description of an illustrative embodiment thereof which is to be read in connection with the accompanying drawings, forming a part hereof, and wherein.

Figure 1:
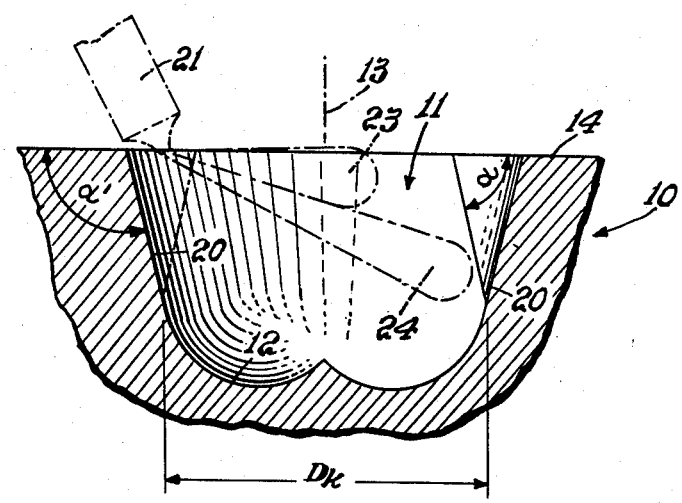
Fig. 1 is a vertical sectional view of a combustion chamber formed in the top of a piston in accordance with this invention, such view being taken along the line I—I of Fig. 2.
Figure 2:
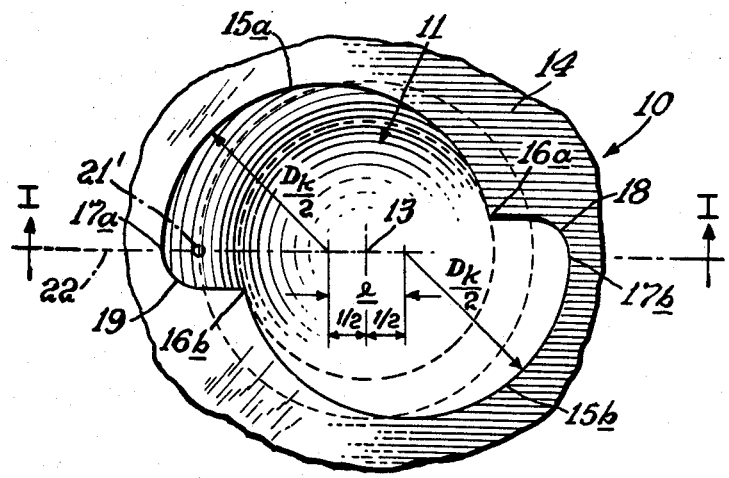
Fig. 2 is a top plan view of the combustion chamber of Fig. 1.

Referring to the drawings in detail, and initially to Figs. 1 and 2 thereof, it will be seen that, in accordance with the invention, the top of a piston 10 is formed with an upwardly opening recess defining a combustion chamber, which is generally identified by the reference numeral 11.

The bottom portion 12 of the combustion chamber 11 has the shape of a surface of revolution which is symmetrical about a central axis 13 perpendicular to the top surface 14 of piston 10, with the generatrix of that body of revolution being either two circular arcs, as indicated in full lines on Fig. 1, or approximately one-half of an ellipse.

The combustion chamber 11 opens upwardly at the top surface 14 of piston 10 without a reduced throat therebetween and, as shown in Fig. 2, the opening of combustion chamber 11 has two identical, semi-circular edge portions 15a and 15b having their centers offset relative to each other by the distance e and being symmetrically located at opposite sides of the central axis 13 of the body of revolution forming the bottom 12 of combustion chamber 11. It is to be noted that the axis 13 corresponds to the longitudinal axis of piston 10, and hence to the axis of the cylinder in which the piston is reciprocable.

It will be apparent that the semi-circular halves 15a and 15b arranged with their centers in offset relationship in the manner indicated above have ends 16a and 16b, respectively, which are spaced a relatively small radial distance from the central axis 13, and opposite ends 17a and 17b, respectively, which are spaced a relatively large radial distance from the central axis 13. The margin of the opening of combustion chamber 11 at top surface 14 of piston 10 is completed by edge portions 18 and 19 extending between the ends 16a and 17b of the semi-circular edge portions, and between the ends 16b and 17a of the semi-circular edge portions, respectively.

The combustion chamber 11 further has a side wall 20 which is formed by the shortest straight lines connecting points along the outer periphery of the bottom 12 with points along the edge of the opening of the combustion chamber at the top surface 14 of piston 10.

In the combustion chamber illustrated in Figs. 1 and 2, each semi-circular edge portion 15a and 15b has a radius equal to one-half the maximum diameter $D_k$ of the bottom portion 12 of the combustion chamber, but it is to be understood that the radius of each semi-circular edge portion 15a or 15b may be smaller or greater than the maximum radius of the bottom 12 so long as the distance by which the center of the circular edge portion is offset or eccentric with respect to the central axis 13 is substantially greater than the difference between the radii of the semi-circular edge portions 15a and 15b and of the bottom 12.

It will be apparent that, in the combustion chamber 11 having the configuration described above, the angle between the side wall 20 and the plane of the top surface 14 of piston 10 continuously changes along each of the semi-circular edge portions 15a and 15b, as indicated in Fig. 1, so that, at the ends 17a and 17b of the semi-circular edge portions, the angle between side wall 20 and the plane of top surface 14 is an obtuse angle, while, at the ends 16a and 16b of the semi-circular edge portions, such angle is acute.

The fuel is injected into chamber 11 from an injector 21, represented in broken lines in Fig. 1, which is disposed above one, or each, of the corners of the opening of the chamber defined by the edge portions 18 and 19 which preferably have a quarter-circular part merging with the semi-circular edge portions at the ends 17b and 17a, respectively. The axis of the injector 21 is suitably inclined with respect to the central axis 13 and preferably lies in the plane 22 (Fig. 2) which contains the central axis 13 and the offset centers of the semi-circular edge portions 15a and 15b. In Fig. 2, the location of the injector 21 is indicated by the point 21'. The injector 21 emits fuel jets 23 and 24 (Fig. 1), with the core of at least the jet 23 impinging against the side wall 20 of the combustion chamber adjacent the opening of the latter at the top surface 14.

Although the above described combustion chamber 11 cannot be machined in the top surface of piston 10, a piston can be cast in a chilled mold with such a combustion chamber formed therein in order to ensure the accurate shaping of that combustion chamber. The chilled casting method is most suitable for forming the combustion chamber of the described shape, even though, with the relative dimensions of the semi-circular edge portions 15a and 15b and of the bottom 12 of the combustion chamber two cores are required. Thus, a piston embodying the combustion chamber 11 in accordance with the invention can be produced at a lower cost than a piston machined in the conventional manner. Furthermore, it is to be noted that the smooth machining of the surface of the combustion chamber is not necessary, as the small protuberances appearing on the surface of the combustion chamber 11 when the latter is chill cast, assists in the evaporation and rebounding of the sprayed fuel, and thus enhance the atomization and mixing of the sprayed fuel with the charge of air.

Figure 3:
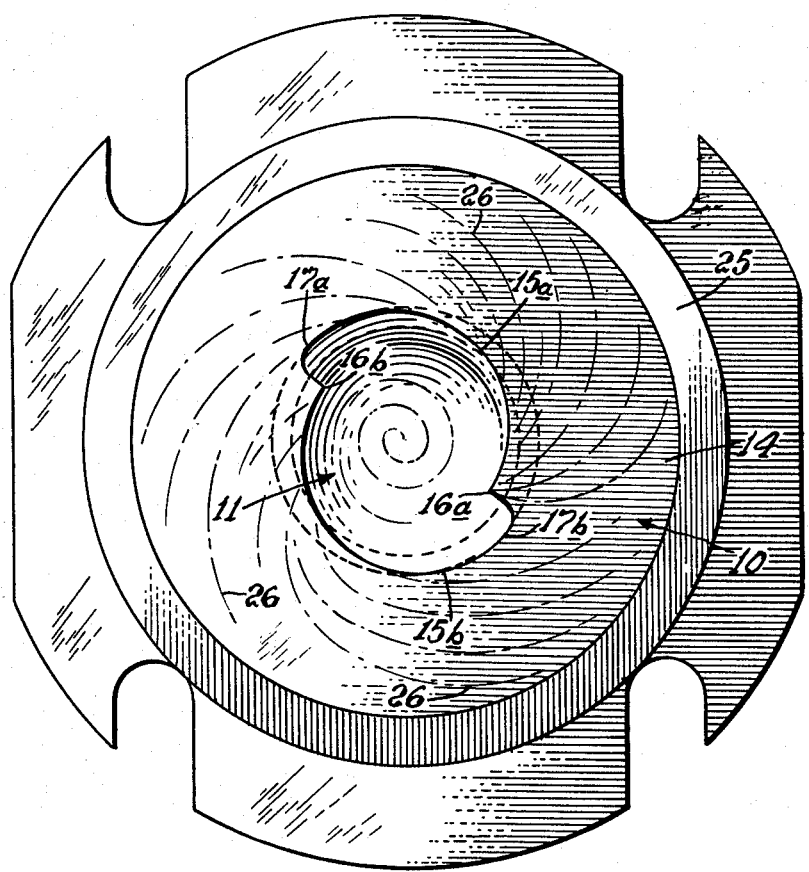
Fig. 3 is a horizontal sectional view of a cylinder containing the piston with a combustion chamber in the top thereof in accordance with the invention.

Referring to Fig. 3 of the drawings, it will be seen that, with the piston 10 disposed within the usual cylinder 25, the charge of air is spirally rotated within cylinder 25 above piston 10, as indicated by the flow lines 26. Thus, the flow of the incoming charge of air generally follows the semi-circular edge portions 15a and 15b and radially enters the combustion chamber 11 at the ends 16a and 16b of such semi-circular edge portions. Thus, the temperatures of the side wall 20 of the combustion chamber continually increase in the direction of the air flow from the points 17a and 17b to the points 16a and 16b, respectively.

In order to ensure proper control of the temperature of the side wall 20, particularly at the point where the jet 23 impinges thereagainst, the piston 10 embodying the invention preferably has a plurality of radial fins 27 formed on the underside of the top of the piston between the gudgeons or bosses 28 intended to receive the wrist pin by which the piston 10 is connected to a connecting rod. The fins 27, which appear in broken lines in Fig. 5, extend from the underside of the bottom 12 of combustion chamber 11 to the inner surface of the skirt of piston 10, and a fan-like oil jet, indicated at 29 in Fig. 4, is sprayed upwardly against the fins 27 in order to promote the cooling of the wall surface of the combustion chamber 11 in the area where the jet 23 impinges thereagainst.

Figure 4:
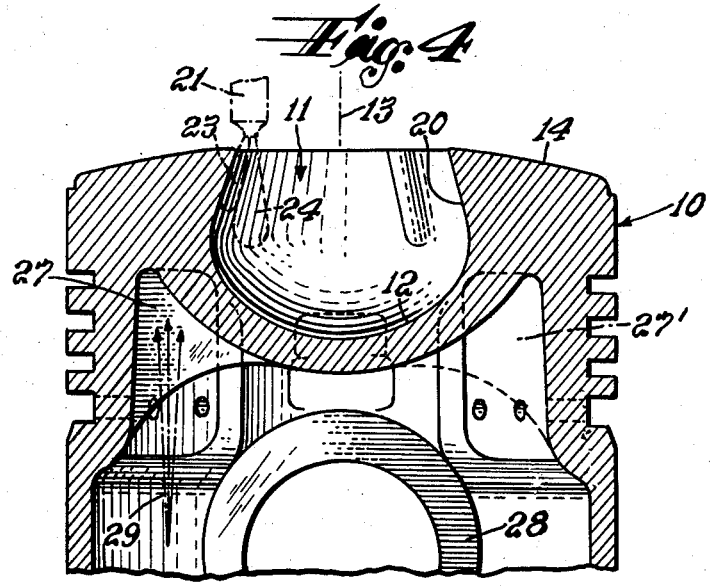
Fig. 4 is a sectional view of an actual piston taken along the line IV—IV of Fig. 5.

Although the fins 27 need be provided only at the side of the piston corresponding to the location of the injector 21, corresponding fins may be provided also at the opposite side of the piston, as indicated in broken lines at 27' on Fig. 4, so that, in assembling the engine, there is no need to ensure that the single set of fins is disposed at the side of the central axis corresponding to the location of the injector 21.

The oil included in the jet 29 is circulated through a separate cooling circuit (not shown) which preferably includes a control valve for regulating the amount of oil included in the jet 29, and thereby adjusting the wall temperature of the combustion chamber 11 to correspond to the particular requirements of the fuel being used.

Figure 5:
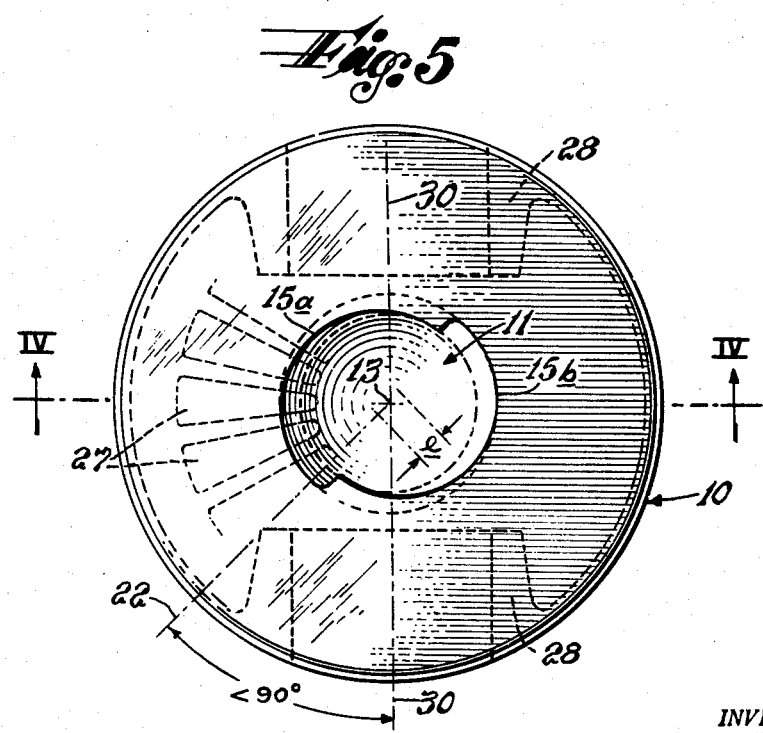
Fig. 5 is a top plan view of the actual piston of Fig. 4.

With reference to Fig. 5, it is to be noted that the plane 22 which extends through the central axis 13 and the centers of the semi-circular edge portions 15a and 15b of combustion chamber 11, and the plane 30 which includes the central axis 13 and the axis of the bosses 28 enclose an angle of less than 90° in the direction opposed to the direction of the entering air, so that the fins 27 may be provided in the necessary location, as described above, without interference from the usual stiffening structure of the piston.

Although an illustrative embodiment of the invention has been described in detail herein with reference to the accompanying drawings, it is to be noted that the invention is not limited to that precise embodiment, and that various changes and modifications may be effected therein without departing from the scope or spirit of the invention, except as defined in the appended claims.

What I claim is:
1. A piston for internal combustion engines of the kind having auto-ignition and direct fuel injection; said piston having a combustion chamber in its top portion and opening at the top surface of the piston, said combustion chamber including a bottom portion in the shape of a surface of revolution concentric with the central axis of the piston, the opening of said combustion chamber at said top surface having equal halves at opposite sides of a plane passing through said central axis and defined by first and second inwardly concave arcuate edge portions, respectively, and connecting edge portions extending between the adjacent ends of said arcuate edge portions, said first arcuate edge portion increasing progressively in its distance from said central axis in the direction from one end to the other end of said first arcuate edge portion and said second arcuate edge portion also increasing progressively in its distance from said central axis in the direction from the end of said second arcuate edge portion which is adjacent said other end of the first arcuate edge portion to the opposite end of said second arcuate edge portion, said arcuate edge portions constituting the major part of the circumferential distance around said opening, said combustion chamber further having a side wall extending from said arcuate edge portions to the periphery of said bottom portion and forming angles with respect to the plane of said top surface of the piston which are obtuse angles, at the ends of said arcuate edge portions farthest from said central axis, and decrease progressively to acute angles, at the ends of the arcuate edge portions closest to said central axis.

2. A piston as in claim 1; wherein said first and second arcuate edge portions of the opening are substantially semi-circular and have their centers offset at opposite sides of said central axis by equal distances, with said centers of the arcuate edge portions lying in said plane passing through said central axis between said halves of the opening.

3. A piston as in claim 1; wherein said piston has axially aligned gudgeons for receiving a wrist pin, and the aligned axes of said gudgeons lie in a plane passing through said central axis which is angularly spaced by an acute angle with respect to said plane passing through the central axis between said halves of the opening.

4. A piston as in claim 3; wherein said piston is hollow and has a skirt depending from said top portion; and further comprising a plurality of radial fins extending from the underside of said combustion chamber to said skirt in the region between said gudgeons to receive a jet of cooling oil for improving the cooling of said side wall of the combustion chamber at an area of the latter intended to be impinged against by jets of injected fuel.

5. In an internal combustion engine having a fuel injector in each cylinder provided with a plurality of orifices emitting fuel jets and means for introducing a swirling flow of air to support combustion in the cylinder; a piston in the cylinder having a combustion chamber in its top portion and opening at the top surface of the piston, said combustion chamber including a bottom portion in the shape of a surface of revolution concentric with the central axis of the piston, the opening of said combustion chamber at said top surface having two halves each of which is defined by an inwardly concave arcuate edge portion progressively increasing in its distance from said central axis along its entire length in the direction generally opposed to the swirling flow of air and a connecting edge portion joining one end of the related arcuate edge portion to the adjacent end of the other arcuate edge portion, said arcuate edge portions constituting the major parts of the peripheries of said halves of the opening, said combustion chamber further having a side wall extending from said arcuate edge portions to the periphery of said bottom portion and forming angles with respect to the plane of said top surface which are obtuse angles, at the ends of said arcuate edge portions farthest from said central axis, and progressively decrease to acute angles, at the ends of the arcuate edge portions closest to said central axis, so that the tendency of the swirling flow of air to enter said chamber is most pronounced at said ends of the arcuate edge portions farthest from said central axis thereby to decrease the cooling effect on said side wall in the direction of said flow of air, said fuel injector being locate so that one of the emitted fuel jets has a relatively short free length and strikes the hot edge of said opening, while other fuel jets are directed in the general direction of said swirling flow of air and strike against said side wall at areas of the latter that are cool in relation to said edge.

References Cited in the file of this patent

FOREIGN PATENTS

| | | |
|---|---|---|
| 146,399 | Austria | Mar. 15, 1936 |
| 866,044 | France | Mar. 31, 1941 |
| 1,078,961 | France | May 19, 1954 |
| 643,351 | Great Britain | Sept. 20, 1950 |
| 643,619 | Great Britain | Sept. 20, 1950 |